US008386686B2

(12) United States Patent
Lin et al.

(10) Patent No.: US 8,386,686 B2
(45) Date of Patent: Feb. 26, 2013

(54) CLOUD COMPUTER

(75) Inventors: Chun-Jen Lin, Taipei Hsien (TW);
Mi-Chien Chen, Taipei Hsien (TW);
Lin-Yi Wang, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 252 days.

(21) Appl. No.: 12/844,987

(22) Filed: Jul. 28, 2010

(65) Prior Publication Data

US 2011/0302348 A1    Dec. 8, 2011

(30) Foreign Application Priority Data

Jun. 7, 2010   (CN) .......................... 2010 1 0193512

(51) Int. Cl.
*G06F 13/00*        (2006.01)
(52) U.S. Cl. ...................................................... 710/303
(58) Field of Classification Search ................ 710/303
See application file for complete search history.

(56) References Cited

U.S. PATENT DOCUMENTS

| | | | | |
|---|---|---|---|---|
| 5,278,730 A * | 1/1994 | Kikinis | ..................... | 361/679.32 |
| 6,029,183 A * | 2/2000 | Jenkins et al. | ................ | 708/100 |
| 6,046,571 A * | 4/2000 | Bovio et al. | ................... | 320/113 |
| 6,049,453 A * | 4/2000 | Hulsebosch | ............. | 361/679.41 |
| 6,216,185 B1 * | 4/2001 | Chu | .............................. | 710/303 |
| 6,309,230 B2 * | 10/2001 | Helot | ............................. | 439/131 |
| 6,315,207 B1 * | 11/2001 | Eisele et al. | .................. | 235/492 |
| 6,493,783 B1 * | 12/2002 | Kinoshita et al. | ............. | 710/303 |
| 6,538,880 B1 * | 3/2003 | Kamijo et al. | .............. | 361/679.4 |
| 6,560,100 B1 * | 5/2003 | Shin et al. | ................. | 361/679.41 |
| 6,563,702 B1 * | 5/2003 | Shin et al. | ................. | 361/679.41 |
| 6,636,918 B1 * | 10/2003 | Aguilar et al. | ................ | 710/303 |
| 6,674,637 B2 * | 1/2004 | Shin et al. | ................. | 361/679.41 |
| 6,697,032 B2 * | 2/2004 | Chitturi et al. | ................ | 345/168 |
| 6,798,647 B2 * | 9/2004 | Dickie | ..................... | 361/679.04 |
| 6,898,076 B2 * | 5/2005 | Pappalardo et al. | ...... | 361/679.41 |
| 6,898,080 B2 * | 5/2005 | Yin et al. | .................. | 361/679.41 |
| 6,945,461 B1 * | 9/2005 | Hien et al. | ..................... | 235/451 |
| D512,066 S * | 11/2005 | Solomon et al. | ............. | D14/434 |
| 6,961,237 B2 * | 11/2005 | Dickie | ..................... | 361/679.04 |
| 7,039,742 B1 * | 5/2006 | Lada et al. | ..................... | 710/301 |
| 7,054,965 B2 * | 5/2006 | Bell et al. | ......................... | 710/72 |
| 7,137,011 B1 * | 11/2006 | Harari et al. | ................... | 713/189 |
| 7,146,445 B2 * | 12/2006 | Appleton et al. | ............. | 710/301 |

(Continued)

FOREIGN PATENT DOCUMENTS

| | | |
|---|---|---|
| CN | 1337633 A | 2/2002 |
| CN | 101334683 A | 12/2008 |

OTHER PUBLICATIONS

"Undock and Go"; Dell Inc.; 2004; available online at dell.com; all pages.*

*Primary Examiner* — Ryan Stiglic
(74) *Attorney, Agent, or Firm* — Altis Law Group, Inc.

(57) ABSTRACT

A cloud computer includes a base, a host, and a battery, in which the host includes a motherboard, a memory connected to the motherboard, and a base connector connected to the motherboard, and the base includes a host connector corresponding to the base connector of the host, and a plurality of input/output ports to connect to peripherals. The battery is mounted on the host and connects to the motherboard to provide electronic power to the motherboard, and the host is detachably connected with the base.

8 Claims, 5 Drawing Sheets

U.S. PATENT DOCUMENTS

| | | | |
|---|---|---|---|
| 7,149,836 B2 * | 12/2006 | Yu et al. | 710/301 |
| 7,197,584 B2 * | 3/2007 | Huber et al. | 710/72 |
| 7,199,999 B2 * | 4/2007 | Shin et al. | 361/679.55 |
| 7,285,021 B2 * | 10/2007 | Bell et al. | 439/623 |
| 7,363,416 B2 * | 4/2008 | Chu | 710/313 |
| 7,533,408 B1 * | 5/2009 | Arnouse | 726/9 |
| 7,543,099 B2 * | 6/2009 | Han | 710/303 |
| 7,558,898 B2 * | 7/2009 | Lodolo et al. | 710/300 |
| RE42,814 E * | 10/2011 | Chu | 726/34 |
| 8,086,777 B2 * | 12/2011 | Ma et al. | 710/300 |
| 2002/0103951 A1 * | 8/2002 | Huber et al. | 710/72 |
| 2002/0149907 A1 * | 10/2002 | Shin et al. | 361/683 |
| 2003/0041206 A1 * | 2/2003 | Dickie | 710/303 |
| 2003/0126335 A1 * | 7/2003 | Silvester | 710/303 |
| 2004/0268005 A1 * | 12/2004 | Dickie | 710/303 |
| 2005/0185364 A1 * | 8/2005 | Bell et al. | 361/679 |
| 2006/0212637 A1 * | 9/2006 | Lo et al. | 710/303 |
| 2008/0059681 A1 * | 3/2008 | Lodolo et al. | 710/303 |
| 2008/0304688 A1 * | 12/2008 | Kumar | 381/370 |
| 2009/0228945 A1 * | 9/2009 | Yaussy | 725/110 |
| 2010/0250816 A1 * | 9/2010 | Collopy et al. | 710/303 |
| 2011/0099315 A1 * | 4/2011 | Ma et al. | 710/302 |

* cited by examiner

CLOUD COMPUTER

BACKGROUND

1. Technical Field

The present disclosure relates to computers, and particularly, to a cloud computer.

2. Description of Related Art

Cloud computing is internet-based computing, whereby shared resources, software, and information are provided to computers and other devices on demand, as with an electricity grid. In general, cloud computing customers need not own the physical infrastructure, and avoid capital expenditure by renting usage time from a third-party provider instead. Customers consume a plurality of resources as a service and pay only for what they use. In addition, "increased high-speed bandwidth" makes it possible to achieve the same level of response times from a centralized infrastructure at other sites.

Cloud computing users can avoid capital expenditure on hardware and software, and requiring only a computer capable of accessing the internet, thus allowing the computer used to be lighter, thinner, and more portable. However, a plurality of power cords and cables connecting peripherals must be detached from the computer for transport.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
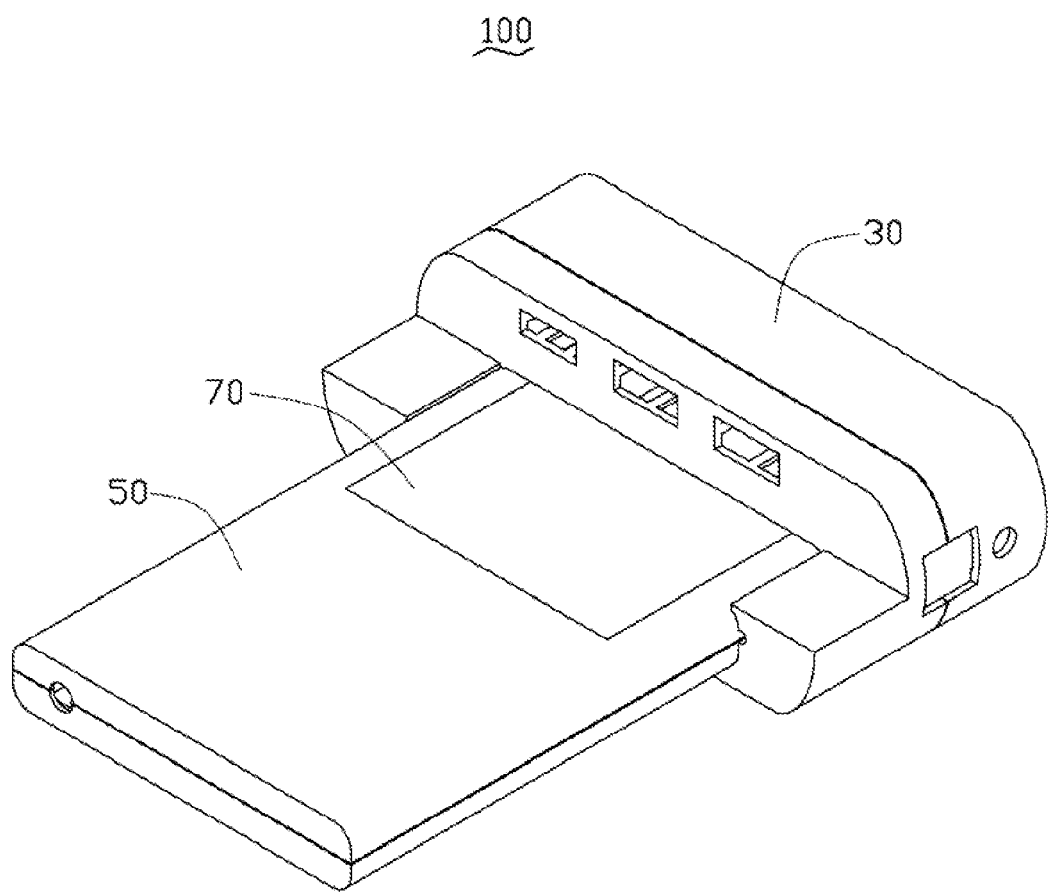
FIG. 1 is an assembled, isometric view of one embodiment of a cloud computer.

Referring to FIG. 1, an embodiment of a cloud computer 100 includes a base 30, a host 50, and a battery 70.

Figure 2:
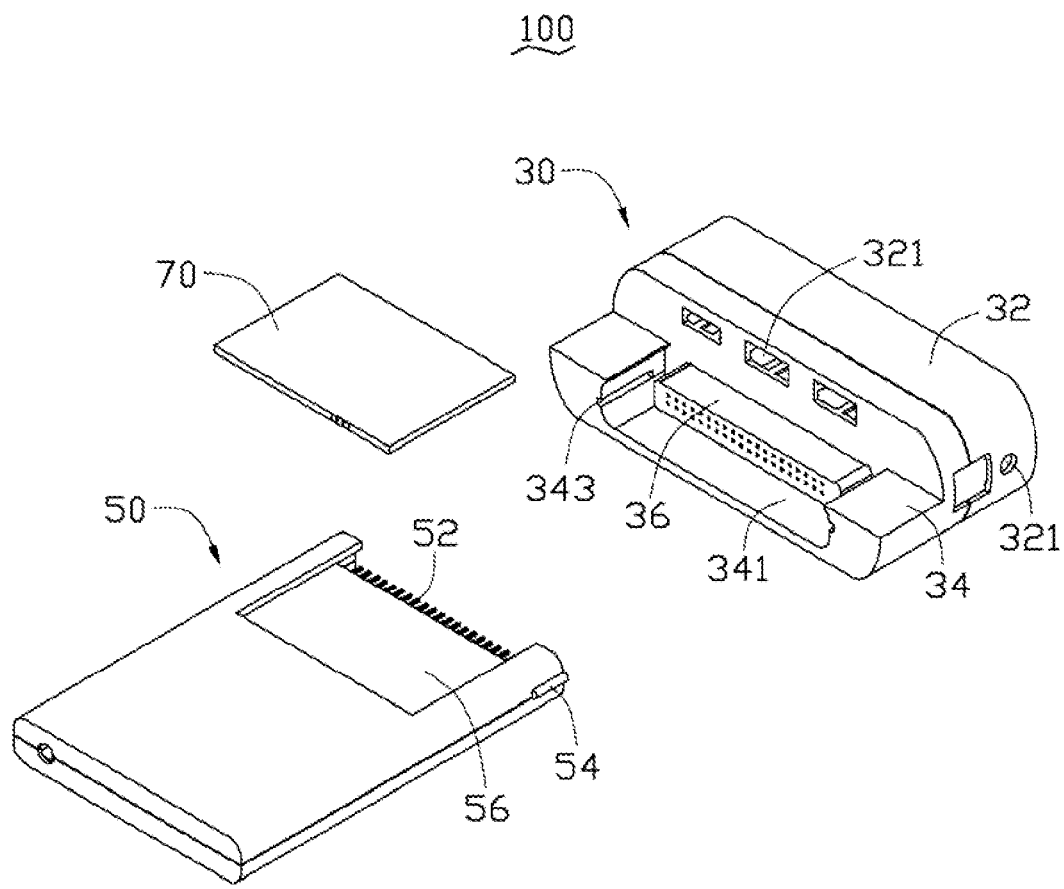
FIG. 2 is an exploded, isometric view of the cloud computer of FIG. 1.
Figure 3:
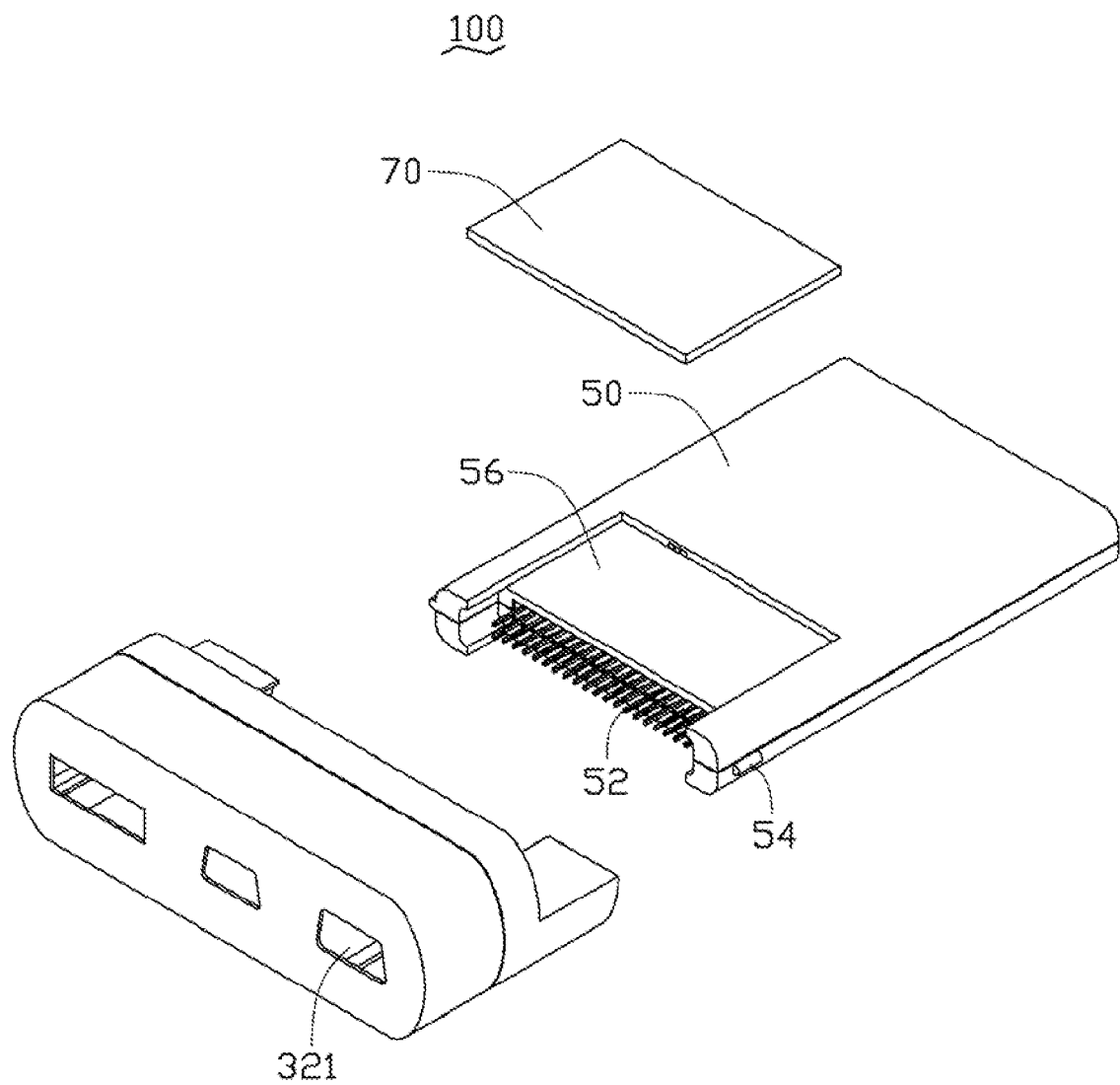
FIG. 3 is similar to FIG. 2, but viewed from another aspect.

Referring to FIGS. 2 and 3, the base 30 includes a connecting portion 32, a supporting portion 34, and a host connector 36. The connecting portion 32 is a box, the host connector 36 is positioned in the connecting portion 32 and a part of the host connector 36 protrudes from one end of the connecting portion 32. The connecting portion 32 includes a plurality of input/output (I/O) ports 321 mounted on a side of the connecting portion 32 above the host connector 36. In the illustrated embodiment, the I/O ports 321 can be at least a power port to receive a power cord, a monitor port to connect to a monitor, a keyboard port to connect to a keyboard, a mouse port to connect to a mouse, an universal serial bus (USB) interface to connect to a peripheral such as a printer, a scanner or other similar device, a local area network (LAN) port to connect to the network, an audio port to connect to a speaker, and so on. The I/O ports 321 are electrically connected with the host connector 36.

The supporting portion 34 extends from one end of the connecting portion 321 on which the host connector 36 is mounted. The supporting portion 34 defines a recess 341, and two guide grooves 343. The host connector 36 is received in the recess 341. The two guide grooves 343 are defined at two inner side surfaces of the recess 341.

The host 50 is substantially rectangular in shape, and includes a base connector 52 positioned at one end corresponding to the host connector 36. The end of the host 50 can be assembled to the base 30 via the base connector 52 engaging with the recess 341 of the supporting portion 34. The host connector 36 and the base connector 52 may be a plurality of PCI (Peripheral Component Interconnect) buses, or ISA (Industry Standard Architecture) buses, in which the base connector 52 has a plurality of pins (not labeled) to increase transmission speed. The host 50 further includes two guide protrusions 54 and a receiving recess 56. The two guide protrusions 54 protrude from an outer surface (not labeled) of the host 50 corresponding to the two guide grooves 343, respectively. The battery 70 is received in the receiving recess 56.

Figure 4:
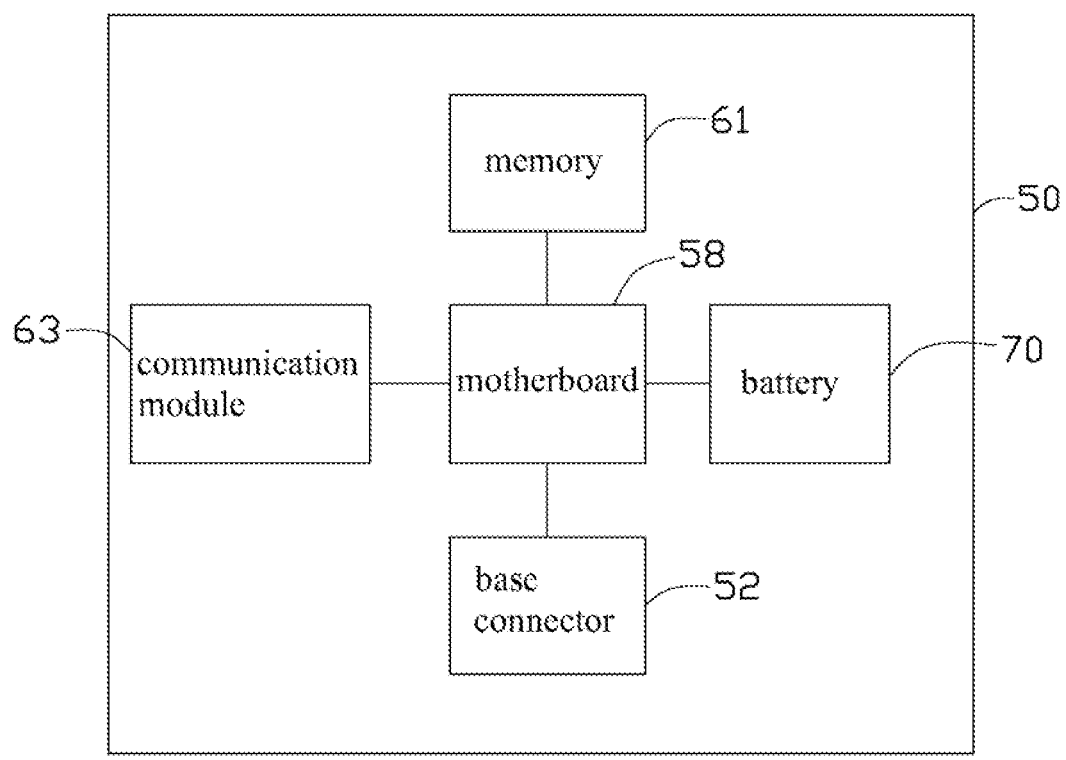
FIG. 4 is a block diagram of the cloud computer of the FIG. 1.

Referring to FIG. 4, the host 50 further includes a motherboard 58, a memory 61 and a communication module 63 mounted in the host 50. The base connector 52, the memory 61, the communication module 63 and the battery 70 are connected to the motherboard 58. The motherboard 58 is capable of communicating with a plurality of servers (not shown) provided by the cloud computing offerings through the network via the base connector 52 and the I/O port 321, and runs the operating systems and the applications provided by the servers.

The memory 61 is configured to temporarily store a plurality of data generated during operation, a plurality of user information, a plurality of data transmitted by the peripherals, and a plurality of documents, respectively. It should be pointed out that memory 61 can also store an operating system and a plurality of applications, such that the motherboard 58 can selectively run the operating systems and the applications provided by the servers, or those which are stored on the memory 61.

The communication module 63 is configured to transmit data. The communication module 63 includes a third-generation (3G) module and a Bluetooth module. The 3G module provides higher transmission rate, and allows simultaneous use of speech and data services at higher transmission rate, even when detached from the base 30. The Bluetooth module is used for exchanging data over shorter distances wirelessly.

Figure 5:
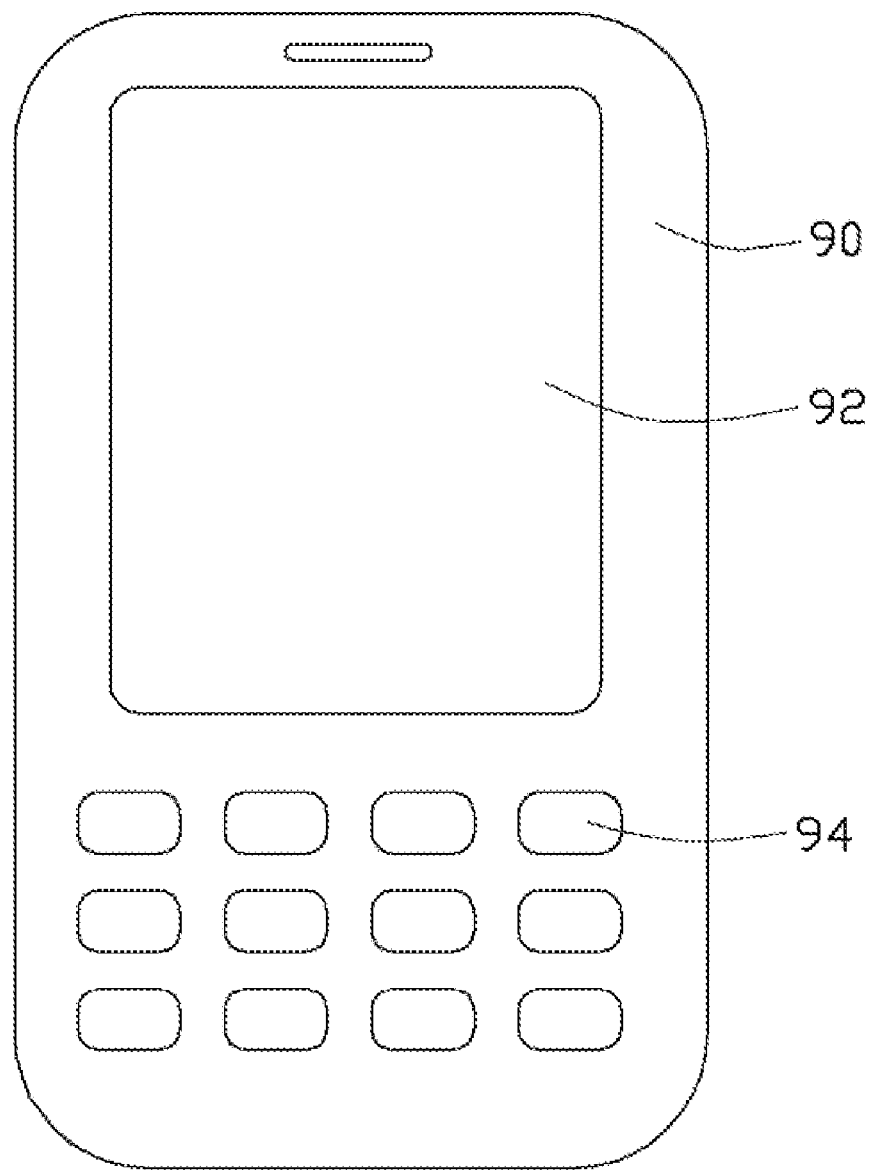
FIG. 5 is an isometric view of a phone used with the cloud computer of FIG. 1.

Referring to FIG. 5, the cloud computer 100 further includes a phone 90. The phone 90 includes a display 92, a keyboard 94, and a Bluetooth module (not shown). The phone 90 is capable of communicating with the host 50 via the Bluetooth module of the phone 90, thus the phone 90 and the 3G module of the communication module 63 cooperatively operate.

In use, the cloud computer 100 connects the host 50 with the base 30. Peripherals are connected with the cloud computer 100 via the I/O ports 321 mounted on the base 30, such that, once the base connector 52 is detached from the host connector 36, the host 50 can be transported without detaching the peripherals.

The host 50 employs fewer components, has reduced failure rate, and is in a significantly minimized profile.

When the host 50 is connected with the base 30, an end of the host 50 is received in the recess 341 to support the host 50, thus the host connector 36 and the base connector 52 are protected.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A cloud computer, comprising:
a base;
a host; and
a battery;
wherein the host comprises a motherboard, a memory connected to the motherboard, and a base connector connected to the motherboard;
the base comprises a connecting portion, a supporting portion extending from one end of the base, a host connector corresponding to the base connector, and a plurality of input/output ports, mounted on a side of the connecting portion above the host connector, configured to be connected to a plurality of peripherals external to the cloud computer,
the host connector and the input/output ports are defined in the connecting portion and the input/output ports are electrically connected with the host connector;
the battery is mounted on the host and connected to the motherboard; and
the host is detachably connected to the base.

2. The cloud computer of claim 1, wherein the supporting portion defines a recess to receive the host connector and a part of the host.

3. The cloud computer of claim 2, wherein the supporting portion further defines at least one guide groove defined at two inner side surfaces of the recess, and the host forms at least one guide protrusion corresponding to the at least one guide groove, respectively.

4. The cloud computer of claim 1, wherein the host defines a receiving recess to receive the battery.

5. The cloud computer of claim 1, wherein the host further comprises a communication module connected to the motherboard to transmit a plurality of data.

6. The cloud computer of claim 5, wherein the communication module comprises a third-generation (3G) module and a Bluetooth module.

7. The cloud computer of claim 6, further comprising a phone, wherein the phone comprises a Bluetooth module corresponding to the Bluetooth module of the host.

8. The cloud computer of claim 1, wherein the input/output ports are a power port, a monitor port, a keyboard port, a mouse port, a universal serial bus (USB) interface, a local area network port, and an audio port.

* * * * *